United States Patent [19]

Wallace et al.

[11] Patent Number: 4,797,145

[45] Date of Patent: Jan. 10, 1989

[54] METHOD OF AGRICULTURAL SOIL IMPROVEMENT

[76] Inventors: Garn A. Wallace, 1647 Manning Ave., Los Angeles, Calif. 90024; Arthur Wallace, 10215 Clematis Ct., Los Angeles, Calif. 90077

[21] Appl. No.: 830,078

[22] Filed: Feb. 18, 1986

[51] Int. Cl.$^4$ ............................................. C05G 3/04
[52] U.S. Cl. ....................................... 71/27; 71/64.12; 71/903; 47/58; 47/DIG. 10
[58] Field of Search ...................... 71/27, 703, 64.12; 47/58, DIG. 10

[56] References Cited

U.S. PATENT DOCUMENTS

| | | | |
|---|---|---|---|
| 2,651,885 | 9/1953 | Hedrick et al. | 47/58 |
| 2,866,296 | 12/1958 | Meadows | 47/58 |
| 2,868,758 | 1/1959 | Baker | 47/DIG. 10 |
| 3,798,838 | 3/1974 | Hashimoto et al. | 47/58 |
| 4,559,074 | 12/1985 | Clarke | 71/24 |

Primary Examiner—Ferris H. Lander
Attorney, Agent, or Firm—Terry M. Crellin

[57] ABSTRACT

Improvement in the physical properties of soil is achieved by the application of aqueous mixtures of agricultural polyelectrolytes and polysaccharides to the soil. The combination of agricultural polyelectrolytes and polysaccharides results in greatly improving the physical properties of the soil while significantly reducing the quantity of agricultural polymers as compared to methods of the prior art.

4 Claims, No Drawings

METHOD OF AGRICULTURAL SOIL IMPROVEMENT

FIELD OF THE INVENTION

In general, this invention relates to methods for the improvement of agricultural soils. In particular, the invention relates to the improvement in undesirable physical properties of agricultural soils that cause or allow the following to occur: water and wind erosion, surface crusting, compaction, excess water run-off from rainfall or irrigation and lack of aeration. The improved agricultural soils have good tilth, are friable, will produce increased crop yields and otherwise will enhance the value of the land. The invention also relates to improvement in soils used in landscaping for ornamental purposes.

STATE OF THE ART

The ability of soils to avoid compaction, crusting, erosion and the lack of aeration depends upon the physical properties of the soil. Ideal soils possess tilth and are friable. Such ideal soils hold water and simultaneously allowing the exchange of gases between the soil and the atmosphere. In addition, plant nutrients are held in the soil in sufficient quantity for good plant yields. The nutrients are held in the soil with sufficient strength to avoid leaching of nutrients from the soil but not too tightly as to preclude the ability of plants to assimilate the nutrients.

The size of the soil particles has a crucial effect upon the desired soil properties. In addition to holding plant nutrients, a desirable soil must provide an adequate supply of both air and moisture to the roots of plants growing therein. Coarse particles, such as sand, allow for excellent aeration, tilth and friability, but such particles unfortunately have extremely poor nutrient-holding capacity and low water-holding capacity. Very fine (small) soil particles, such as fine clays, allow for good nutrient-holding capacity and water absorption but prevent good aeration and generally have poor tilth and friability. Soils of poor structure may become waterlogged during wet seasons and are unable to allow for good plant growth and development. Water infiltration is slow and these soils may lose moisture rapidly due to surface evaporation or as run-off water which carries the fine soil particles away and deposits them at lower elevations or discharges them into waterways. Poor soils having excessive amounts of fine particles are also carried by winds and are blown away. Such poor soils have poor tilth, and poor germination of seeds planted therein is common due to the lack of either air or moisture required for normal germination.

The ideal soil would have coarse particles or crumbs composed of finer particles. These coarse particles would need to remain intact in the presence of water and resist weathering and mechanical abrasion. The fine micro pores inside the coarse particles allow for good water retention and nutrient binding, while the space between the coarse particles allows for good aeration.

Natural means, such as mycelia of mold fungi, bacterial slime, slimy secretions of animals (particularly earthworms), and residue of organic materials, exist for cementing fine particles together into desirable larger particles or crumbs. Such crumbs advantageously form "water stable aggregates" that are not broken down by impact of rain or excessive amounts of water. Cultivation of soils lowers the content of "water-stable aggregates" and arid soils have a low initial content of "water-stable aggregates" because of low natural cement concentrations in these soils due to lack of organic matter. Organic residues, especially those which are stable following composting, can be added to soil for natural aggregation. Unfortunately, such natural aggregation occurs slowly over a period of time, and the expense of transporting the large quantities of needed organic matter per acre of land is generally prohibitive. Further, because of the large acreage of land needing improvement, the required quantity of organic matter exceeds the total amount which for all practicality is available.

Polyelectrolytes have been disclosed as being useful in conditioning soil to improve the soil structure. The use of polyacrylamide as a soil conditioner is taught in U.S. Pat. Nos. 2,625,529 and 2,652,380. In U.S. Pat. No. 3,798,838 it is said that a mixture of water soluble plant nutrient salt and partially hydrolyzed polyacrylamide produces a synergistic effect on decreasing permeability of the soil. A soil conditioner consisting of a mixture of polyacrylamide and pumice is disclosed in U.S. Pat. No. 2,765,291, and a mixture of polyacrylamide and exfoliated particulate vermiculite is taught in U.S. Pat. No. 2,765,290.

The technology which was suggested in U.S. Pat. Nos. 2,652,529 and 2,652,380 did not succeed and was never used commercially. After ten years or more of development, the developers gave up and abandoned their efforts. The principal reasons for failure of the technology was that the process was too costly, too hard to use and yielded non-uniform results. The minimum useful rate of polymer application in actual practice was 0.05% by soil weight and generally a rate of 0.25% was necessary to achieve any significant improvement in the soil. Unless the polymers were thoroughly mixed into very dry soil with intimate contact with all soil particles to be treated, the response was minimal and inconsistent. If the polymers were applied to soil that was too wet, mixing could not be achieved because the polymers either formed a surface gel or fixed onto soil in a non-uniform spacial distribution. The natural variability in soil types with different kinds of clay and different pH values, and different quantities of soil organic matter led to widely divergent, non-uniform response.

Objectives

A principal objective of the present invention is to develop a technique for significantly decreasing the quantity of agricultural polymers required to improve soils by imparting good tilth to the soils while simultaneously making the soils friable. A further objective of this invention is to provide a method to decrease the labor and number of steps required to aggregate soil particles into "water-stable" form. A still further objective of the present invention is to provide a more universal process for the application of agricultural polymers wherein the polymers are functional in more soil types and with varying soil conditions allowing for less precision in selecting an agricultural polymer, in selecting an application method and in choosing an appropriate rate of polymer application.

DESCRIPTION OF THE INVENTION

In accordance with the present invention, the above objectives are achieved and an improved method is provided for greatly improving the soil structure while significantly reducing the quantity of agricultural polymers required as compared to methods of the prior art. The tilth, structures, aeration, friability and water infiltration of soils subject to slaking, erosion, compaction and crusting are improved in accordance with the present invention by a very simple, effective and completely unexpected method which comprises incorporating water-soluble agricultural polymers and a polysaccharide in the water used to irrigate the soil. The amount of agricultural polymers which are incorporated in the irrigation water is from about 0.00001% to 0.1% by weight of the irrigation water, and the irrigation water is applied to the soil in an amount to infiltrate the soil to a depth of about ⅛ inch and up to 6 inches or more. The agricultural polymers comprise water-soluble polyelectrolytes having an average molecular weight of at least about 15,000. The amount of polysaccharides which are incorporated in the irrigation water is from about 1% and 300% by weight of the amount of agricultural polymers which are used. The polysaccharides are natural and semisynthetic materials having a molecular weight of at least about 50,000.

Various synthetic agricultural polymers, also referred to as polyelectrolytes, are very useful in the process of this invention. These polymers bind the fine soil particles together to form "water-stable aggregates." A description of applicable synthetic agricultural polyelectrolytes is found in the prior art. These agricultural polymers include the copolymer of vinyl acetate and a monoester of maleic acid (U.S. Pat. No. 2,652,380), copolymers of acrylic acid and acrylamide (U.S. Pat. No. 2,652,381) and a class of polymers which are described in U.S. Pat. No. 2,625,529 as:

"polymers of acrylic acid, salts of polymers of acrylic acid, salts of hydrolyzed polymers of acrylonitrile, hydrolyzed polymers of acrylonitrile, polymers of methacrylic acid, salts of polymers of methacrylic acid, salts of hydrolyzed polymers of methacrylonitrile, hydrolyzed polymers of methacrylonitrile, salts of copolymers of unsaturated polycarboxylic acids and at least one other monoolefinic monomer, copolymers of unsaturated polycarboxylic acids and at least one other monoolefinic monomer, salts of hydrolyzed copolymers of unsaturated polycarboxylic acid anhydrides and at least one other monoolefinic monomer, hydrolyzed copolymers of unsaturated polycarboxylic acid anhydrides and at least one other monoolefinic monomer, salts of copolymers of the partial alkyl esters of unsaturated polycarboxylic acids and at least one other monoolefinic monomer, copolymers of unsaturated dicarboxylic acid anhydrides and at least one other monoolefinic monomer, copolymers of the partial alkyl esters of unsaturated polycarboxylic acids and at least one other monoolefinic monomer, salts of sulfonated polymers of hydrocarbons containing aliphatic unsaturation, sulfonated polymers of hydrocarbons containing aliphatic unsaturation, polymers of amines containing aliphatic unsaturation, and polymers of amides containing aliphatic unsaturation."

The prior art teaches that these synthetic agricultural polyelectrolytes having a molecular weight of at least 15,000 are to be incorporated into the soil at rates not to exceed 0.2 percent by weight, with optimum rates between 0.02 percent and 0.1 percent by weight. However, as mentioned previously, the minimum useful rate in actual practice was 0.05% by soil weight and generally 0.25% was needed to achieve acceptable soil improvement.

The preferred method of application of agricultural polymers in the prior art was the application of the polymers in the form of dry powders to the soil. The powdered polymers were then completely mixed throughout the soil to be improved. After mixing the polymers with the soil, water was then added to provide a means to dissolve the polymer for intimate binding of the soil crumbs for the formation of "water-stable" aggregates. If done properly, the resulting crumbs will not slake and disintegrate in the presence of additional water. However, in the initial process of water application to form the crumbs, the soil would, in many instances, tend to slake, and upon drying the soil, the entire area would have cemented together forming compacted soil which required a second cultivation to break up the soil into smaller crumbs. These crumbs resulting from the second cultivation were now "water-stable" and did not tend to slake when subjected to additional water.

In U.S. Pat. No. 2,625,529, the patentees did mention that water could be used as a diluent and that when polymers were applied to soil in water solution, the drying and retilling steps of the process were not necessary. The patentees did not recommend this technique however. The reason most likely why application of the polymers in water solution was not recommended is that it was impossible in practice. The agricultural polymers are very difficult to place into solution at 0.1% and moreso at 0.2%. The rates of application of the polymers as taught in U.S. Pat. No. 2,625,529 were 1000 to 2000 pounds per acre. In practice the polymers are used at rates of up to 5000 pounds per acre or more. To place even the lesser rates of polymers in accordance with U.S. Pat. No. 2,625,529 into solution at 0.1% would require one and two million pounds of water per acre which is 0.37 and 0.74 acre feet of water respectively, or 120,000 and 240,000 gallons of water. Not only would making the solution be an enormous task, but also the amount of water used is three times the value of water that the plow depth of an acre of soil will hold at saturation.

In accordance with the present invention, synthetic, water-soluble polyelectrolytes or polymers of agricultural importance are incorporated into the soil in combination with a water-soluble polysaccharide. The polyelectrolytes or agricultural polymers and the polysaccharides are applied to the soil in solution in the water being used to irrigate the soil. The amount of polyelectrolytes or polymers incorporated into the irrigation water is between about 0.00001% and 0.1% weight of the irrigation water. The amount of polysaccharides can be anywhere between about 1% and 300% of the amount of polyelectrolytes and preferably between about 5% and 300% of the amount of polyelectrolytes. That is, the concentration of polysaccharides can be anywhere between about 1/100 to 3 times and preferably between about 1/20 to 3 times the concentration of polyelectrolytes in the irrigation water. Thus, if the irrigation water is to contain 0.01% or 100 parts per million by weight polyelectrolytes, there should also be added to the water from 1 to 300 parts per million by weight polysaccharides.

Among the polysaccharides which are useful in the present invention are natural and semisynthetic polysaccharides selected from the group consisting of algal (seaweed) polysaccharides including agar, carrageenan and algin; plant polysaccharides including gum arabic, gum ghatti, gum karaya, gum tragacarth, guar gum, guar gum derivatives, locus bean gum, pectin, larch gum and other plant gums; polysaccharides from cellulose derivatives including carboxymethylcellulose, hydroxyethylcellulose, hydroxypropylcellulose, methylcellulose and microcrystalline cellulose; and microbial polysaccharides including xanthan gum, dextran, scheroglucan, curdlan, pollulan, baker's yeast glycan and bacterial alginate. Synthetic polysaccharides which are the same or similar to any of the above synthetic or semisynthetic polysaccharides can also be used in the present invention if such synthetic polysaccharides are available. The polysaccharides which are used should have molecular weights of at least about 50,000. The polysaccharides can either be neutral or acidic.

In accordance with the present invention, the application of the polyelectrolytes and polysaccharides in the irrigation water is feasible because of the small concentrations which are used. The polyelectrolytes and polysaccharides are easily placed into solution at the concentrations used, and the amount of water used is only that which is necessary to saturate the plow depth of the soil or the depth otherwise desired. For example, an application of up to 10 pounds of polymers per acre can be accurately and effectively placed in the plow depth of soil that has recently been tilled by irrigating the soil with water containing a polymer concentration of 29 ppm, with the amount of irrigation water being about 340,000 pounds or 41,000 gallons per acre. A stock solution of 3,000 ppm of polymers can be prepared, and the stock solution is then diluted 100 fold in the sprinkler system. An acre would require about 40 gallons of stock. The results would be crusting control, good erosion control, improved water penetration and improved soil aeration. The concentration of polyelectrolyte applied to the soil would be 0.0005% by weight of the soil.

It was suggested in U.S. Pat. Nos. 2,625,529 and 2,652,380 that when the polyelectrolytes were applied in a water solution, the unstable crumbs were stabilized and became "water-stable" without slaking. Such a method would eliminate the cultivation to reform the aggregates to the desired size. Even so, the two patents specifically taught the mixing of dry polymers into dry soil as the preferred method. As mentioned previously, the probable reason that application of the polymers in a water solution was not favored in the prior art is that unrealistic, prohibitive amounts of water were required. The method of applying dry polymers was the only reasonable method under the circumstances. The dry polymers were applied and mixed with the soil and the soil was then wetted with water and dried. Finally, the dried soil was recultivated to reform the aggregated of soil to the desired size. The procedure resulted in considerable failure, but there was no feasible alternative.

In U.S. Pat. No. 2,625,529 it is said that the polymers were effective in soil down to 0.001% by weight of the soil. However, there was no data presented to substantiate such a claim. In fact, Table IV of that patent shows conclusively that applications of two tested polymers at rates of 0.001% resulted in failures. The polymers had to be applied at much larger rates. This has been borne out by years of experience by those experimenting with the polymers. Years of experience has shown that rates of 0.05% to 0.25% or greater are required when used in accordance with the prior art as exemplified in U.S. Pat. No. 2,625,529.

In accordance with the present invention, a more efficient method has been developed to enhance the potency of the polymers used in agriculture. This results in a very large decrease in the concentrations of the polymers in water applications. The polymers can be applied without an overwhelming amount of water being used to inundate and waterlog the soil. With the methods of the present invention, highly favorable responses in soil improvement are achieved with the application of polymer in an amount of 0.001% and less by weight of the soil. The discovery that makes this possible constitutes an essential part of the present invention. That discovery is that irrigation of soil with solutions containing a mixture of agricultural polymers and polysaccharides at very low concentrations is effective in improving the soil. With the method of this invention, application of as little as 0.000025% to 0.00005% of the agricultural polymer by weight of the soil is effective in overcoming crusting of the soil surface, improving water infiltration into the soil minimizing soil errosion and increasing soil aeration. Application of the agricultural polymers at rates of 5,10, to 20 pounds per acre (0.00025% to 0.001% by weight of soil) or higher can be used depending upon the circumstances.

It is theorized, without an intent to be bound to or by any explanation or theory, that the polysaccharides coact with clay colloids in the soil and the agricultural polymers thereby overcoming a mutual repulsion which otherwise exist between the clay colloids and the polymers. Clay colloids are negatively charged as are most of the agricultural polymers used in agriculture. In solution, high concentrations of polymer are normally necessary to overcome the mutual repulsion of the polymers and the clay colloids. It is thought that by adding the neutral or acidic polysaccharides to the negatively charged polymers, the charge repulsion is decreased and far less concentrations of polymers are needed for soil improvement.

In a related embodiment of the invention, fertilizer salts are incorporated together with the polysaccharides and agricultural polymers in the irrigation water. The cations of the fertilizer salts are believed to be effective in suppressing the polymeric and colloid negative charges so as to enhance binding of the agricultural polymers to the clay particles in the soil. It has also been found that the addition of a dilute acid to the irrigation water containing the polysaccharides and agricultural polymers is also beneficial. The protons from the acids are believed to bind to negative sites of the agricultural polymers and the clay particles to lower the charge density and allow closer contact between the polymers and clays for stronger binding and conditioning.

Fertilizer salts which can be used include ammonium nitrate, ammonium nitrate-sulfate, monoammonium phosphate, ammonium phosphate-sulfate, ammonium phosphate-nitrate, diammonium phosphate, ammonium sulfate, aqua ammonia, calcium ammonium nitrate, calcium nitrate, calcium cyanamide, sodium nitrate, magnesium nitrate, magnesium sulfate, urea ammonium nitrate, potassium chloride, potassium nitrate, potassium sulfate, calcium chloride and sulfate of potash magnesia. Acids which can be used include mineral acids such as sulfuric, hydrochloric, phosphoric, superphosphoric, and nitric acids as well as organic acids such as citric and acetic.

The amounts of the fertilizer salts which can be used are from 5% to 300% of the agricultural polymer. The acids can be used in amounts sufficient to give an ultimate pH of the irrigation water of between about 4.0 to 6.9.

The amount of agricultural polymers which are needed to effect minimum soil improvement in the field can be determined in laboratory tests for first clear or full flocculation of the soil. In such tests, a two gram sample of soil is placed in a test tube with about 10 ml of water. Aliquots of a stock solution of the test polymers are added to the test tube, and the mixture in the test tube is shaken. Additional aliquots of the stock polymer solutions are added until the soil flocculates and the suspension becomes clear. First clear flocculation is the point where the water solution fully separates from the soil particles as a separate phase. Full flocculation is achieved with additional agricultural polymer wherein the soil particles appear to achieve maximum size. When applied in the field, the amount of polymer, polysaccharide and fertilizer salt which produce first clear flocculation or full flocculation in laboratory tests effectively prevents crusting of the soil, enhances water infiltration in the soil, and greatly improves the soil aeration.

The results of such laboratory tests in which polyacrylamide was the agricultural polymer used is shown in Table 1. The values shown for amount of polymer per 2 million pounds of soil (one acre) were calculated from the amount of polymer added to the soil sample in each test. The agricultural polymer when used alone in the water results in effective soil conditioning as would be expected from the prior art. Addition of a polysaccharide to the water together with the agricultural polymer greatly improves the efficiency of the soil improvement, and even greater efficiency is obtained when a polysaccharide and a fertilizer salt are used simultaneously with the agricultural polymer. The rates of application of the three components of the solutions for each of the three soils indicated in Table 1 would be well below 0.001% by weight of the soil in the field.

TABLE 1

AGRICULTURAL POLYMER NEEDED IN POUNDS POLYMER PER 2 MILLION POUNDS SOIL FOR FIRST CLEAR FLOCCULATION OF SOIL*

| Water Solution | Natrargid | Soil Torriorthents | Xerorthents |
|---|---|---|---|
| 1. Polyacrylamide solution** | 12 | 20 | 20 |
| 2. Polyacrylamide, polysaccharide solution*** | 10 | 10 | 18 |
| 3. Polyacrylamide, polysaccharide fertilizer salt solution**** | 5 | 5 | 10 |

*minimum rate for soil improvement in the field
**water containing aliquots of polyacrylamide only
***water containing aliquots of polyacrylamide and polygalactosylmannose
****water as in 2 also containing 1000 ppm ammonium sulfate Treatment of soils with irrigation water containing a mixture of agricultural polymers, polysaccharide, and fertilizer salt has been shown to improve the permeability of the soils to water. As shown in Table 2, application of water containing polyacrylamide, polygalactosylmannose, and a fertilizer salt, ammonium sulfate, to a soil considerably improves the water penetration of the soil. The inclusion of a small amount of citric acid helps to decrease slaking of the soil. Water infiltration for an entire crop season can be improved by application of less than 0.001% agricultural polymer to the soil by weight.

TABLE 2

TIME FOR LEACHING A YOLO LOAM SOIL (XERORTHENTS)

| Irrigating Solution | Time for Leaching of 8 Volumes of Solution | Resulting Permeability of Soil to Water After Drying |
|---|---|---|
| 2 ppm polyacrylamide | 8 hours | Very permeable |
| 2 ppm of mixture of 80% polyacrylamide, 16% polygalactosylmannose, and 4% citric acid, and 4 ppm ammonium sulfate | 18 minutes | Very permeable |
| Deionized water | 8 hours | Not permeable |

If 3-acre feet of irrigation water containing 2 ppm of the polyacrylamide mixture of Table 2 were applied to a soil in the field over a year, the total polyacrylamide polymer used would be 16 pounds per acre or 0.0008% by weight of the soil.

The time for leaching a unit volume of irrigation water through soil is shown in Table 3. As little as ¼ ppm of agricultural polymer in solution can improve water penetration or leaching through the soil. However, using an irrigation solution containing the agricultural polymer, a polysaccharide, and a fertilizer salt results in a remarkable, completely unexpected improvement in leaching rate.

TABLE 3

EFFECT OF POLYMER AND POLYMER MIXTURE ON WATER PENETRATION INTO CULTIVATED SOILS WHICH SLAKE WHEN WATER IS APPLIED

| Soil | Time to Leach Equal Units of Various Irrigation Water Solutions Through Soil | | | | |
|---|---|---|---|---|---|
| | A | B | C | D | E |
| Imperial Valley soil (Torriorthents) with no previous treatment | 12 minutes | 40 seconds | 35 seconds | 10 seconds | 12 seconds |
| Imperial Valley soil which had been previously treated with 20 pounds per acre of polyacrylamide | 15 minutes | 12 seconds | 25 seconds | 5 seconds | 5 seconds |

The irrigation water solution A of Table 3 was water alone with no additives. The irrigation solution B was a water containing 2 ppm of polyacrylamide. The irrigation solution C was water containing ¼ ppm of polyacrylamide. The irrigation solution D was water containing 4 ppm of ammonium sulfate and 2 ppm of a mixture of 80% polyacrylamide, 16% polygalactosylmannose and 4% citric acid. The irrigation solution E was water containing 4 ppm of ammonium sulfate and ¼ ppm of a mixture of 80% polyacrylamide, 16% polygalactosylmannose, and 4% citric acid.

Six inches of irrigation water containing ¼ ppm of the agricultural polymer would use only ¼ pound polymer per acre and would amount to not over 0.00002% by weight polymer in the soil.

Some soils, such as clay, respond poorly to agricultural polymers because of the chemical characteristics of the soils. As shown in Table 4, three different clay soils respond extremely well to the treatment of the present invention. The treatment of the present invention is seen to be highly advantageous in that it is generally universal, i.e., a favorable response can be obtained from almost all type soils.

TABLE 4
EFFECT OF MIXTURE OF POLYELECTROLYTE POLYSACCHARIDES, ACID, AND SALT IN IMPROVING PHYSICAL PROPERTIES OF CLAY SOILS COMPARED WITH POLYMER ALONE

| Treatment (solution being added to soil suspension) | Polymer lbs/acre equivalent for response | Response | Water stable aggregates |
|---|---|---|---|
| Imperial Valley Soil (clareous clay) | | | |
| 100 ppm polyacrylamide in solution | 40 | first clear flocculation | no |
| 200 ppm (NH$_4$)$_2$SO$_4$ plus 100 ppm of a mixture consisting of 80% polyacrylamide, 16% polygalactosylmannose, and 4% citric acid | 20 | first clear flocculation | partly |
| 100 ppm polyacrylamide in solution | 160 | full flocculation | yes |
| 200 ppm (NH$_4$)$_2$SO$_4$ plus 100 ppm of a mixture consisting of 80% polyacrylamide, 16% polygalactosylmannose, and 4% citric acid | 50 | full flocculation | yes |
| San Bernardino Mall Soil (calcareous clay) | | | |
| 100 ppm polyacrylamide in solution | — | no flocculation at any rate | |
| 600 ppm (NH$_4$)$_2$SO$_4$ plus 100 ppm of a mixture consisting of 80% polyacrylamide, 16% polygalactosylmannose, and 4% citric acid | 23 | first clear flocculation | partly |
| 600 ppm (NH$_4$)$_2$SO$_4$ plus 100 ppm of a mixture consisting of 80% polyacrylamide, 16% polygalactosylmannose, and 4% citric acid | 58 | full flocculation | yes |
| Maxie Flat, Kentucky Soil (acid clay)* | | | |
| 100 ppm polyacrylamide in solution | 12 | first clear flocculation | no |
| 100 ppm polyacrylamide in solution | 80 | full flocculation | slight |
| 200 ppm (NH$_4$)$_2$SO$_4$ plus 100 ppm of a mixture consisting of 80% polyacrylamide, 16% polygalactosylmannose, 4% citric acid | 4 | first clear flocculation | no |
| 200 ppm (NH$_4$)$_2$SO$_4$ plus 100 ppm of a mixture consisting of 80% polyacrylamide, 16% polygalactosylmannose, and 4% citric acid | 40 | first clear flocculation | fairly good |

*This soil does not respond to the polyelectrolyte polymer alone when applied to the soil when dry and responds only when applied in the irrigation water.

Various natural, water-soluble polysaccharides were tested with water containing polyacrylamide to confirm the effect on the reduction in quantity of the polyacrylamide needed for flocculation of dispersed soils. The test procedures were similar to these described previously for determining first clear flocculation and full flocculation in laboratory tests for determining the amount of agricultural polymer necessary for soil improvement in the field. The polysaccharides tested were from a variety of natural sources.

A sample of torriorthents soil from Brawley, Calif. was tested with a water solution of polyacrylamide. The amount of polyacrylamide required to produce laboratory flocculation was 14 pounds per acre equivalent. When a sample of the same soil was tested with a water solution containing polyacrylamide and a polysaccharide of $9.5 \times 10^6$ molecular weight composed of rhamnose, galactose, glucuronic acid and galacturonic acid isolated from *Sterculia urens* commonly called gum Karaya, laboratory flocculation was achieved only 10 pounds per acre equivalent of polyacrylamide. The amount of polysaccharide used was 1500 pounds per acre equivalent.

A sample of the same soil from Brawley, Calif. was tested with a water solution containing polyacrylamide and a polysaccharide of 250,000 molecular weight composed of galactopyranose, glucuronic acid, arabinofuranose and rhamnopyranose isolated from *Acacia senegal* commonly called gum arabic. Laboratory flocculation was achieved using 10 pounds per acre equivalent of polyacrylamide. The amount of polysaccharide used was 50 pounds per acre equivalent. In tests wherein up to 2500 pounds per acre equivalent of polysaccharide was added to the soil before the addition of the polyacrylamide, laboratory flocculation still required 14 pounds per acre equivalent of polyacrylamide. Thus, it can be seen that the separate application of polysaccharide and agricultural polymer is not beneficial. The agricultural polymer and the polysaccharide must be mixed together in the water which is applied to the soil.

Another sample of the same soil from Brawley, Calif. was tested with a water solution containing polyacrylamide and a polysaccharide of 300,000 molecular weight composed of polymannose with galactosyl side chains isolated from *Certonia siliqua* commonly called locust bean gum. Laboratory flocculation was achieved using 5 pounds per acre equivalent of polyacrylamide. The amount of polysaccharide used was 30 pounds per acre equivalent.

A further sample of the same soil from Brawley, Calif. was tested with a water solution containing polyacrylamide and polygalactopyranose isolated from *Gelidium cartilagineum* commonly called agar. Laboratory flocculation was achieved using 3 pounds per acre equivalent of polyacrylamide. The amount of polysaccharide used was 1700 pounds per acre equivalent.

An additional sample of the same soil from Brawley, Calif. was tested with a water solution containing polyacrylamide and a polysaccharide of at least 2,000,000 molecular weight composed of mannose, glucose and glucuronic acid isolated from *Xanthomonas campestris* commonly called xanthan gum. Laboratory flocculation was achieved using 6 pounds per acre equivalent of polyacrylamide. The amount of polysaccharide used was 800 pounds per acre equivalent.

Whereas there are here described preferred embodiments of processes presently contemplated as the best modes of carrying out the invention, it is to be understood that various changes may be made without departing from the subject matter coming within the scope of the following claims, which subject matter is regarded as the invention.

We claim:

1. The method of improving the tilth, structure, aeration, friability and water infiltration of soils subject to slaking, erosion, compaction, or crusting, said method comprising mixing a synthetic, water soluble polyelectrolyte and a polysaccharide with water, wherein said polyelectrolyte consists essentially of polyacrylamide having an average molecular weight of at least 15,000, with said polyelectrolyte being mixed with the water in an amount of between about 0.0001% and 0.1% by weight, and further wherein said polysaccharide consists essentially of polygalactosylmannose, with said polysaccharide being mixed with the water in an amount of between about 1% and 300% of the amount of polyelectrolyte, and applying the mixed water solution to the soil.

2. The method of claim 1 wherein a mineral acid or a small molecular weight organic acid is also added to the water in an amount sufficient to produce a pH of between about 4 and 6.5.

3. The method of claim 2 wherein a fertilizer salt is also added to the water in an amount between about 5% and 300% of the amount of polyelectrolyte.

4. The method of claim 1 wherein a fertilizer salt is also added to the water in an amount between about 5% and 300% of the amount of polyelectrolyte.

* * * * *